US 11,794,273 B2

(12) United States Patent
Odakura et al.

(10) Patent No.: US 11,794,273 B2
(45) Date of Patent: Oct. 24, 2023

(54) FRICTION STIR WELDING APPARATUS AND FRICTION STIR WELDING METHOD

(71) Applicant: Hitachi Power Solutions Co., Ltd., Hitachi (JP)

(72) Inventors: Tomio Odakura, Hitachi (JP); Hiroki Abe, Hitachi (JP); Akihiro Satou, Hitachi (JP); Kohei Funahara, Hitachi (JP); Koichi Ishiguro, Hitachi (JP); Shun Shinohara, Hitachi (JP); Yukihiro Sugimoto, Hiroshima (JP); Katsuya Nishiguchi, Hiroshima (JP); Koujirou Tanaka, Hiroshima (JP); Yasuhiro Morita, Hiroshima (JP)

(73) Assignee: Hitachi Power Solutions Co., Ltd., Hitachi (JP)

(*) Notice: Subject to any disclaimer, the term of this patent is extended or adjusted under 35 U.S.C. 154(b) by 284 days.

(21) Appl. No.: 17/041,346

(22) PCT Filed: Mar. 27, 2019

(86) PCT No.: PCT/JP2019/013446
§ 371 (c)(1),
(2) Date: Sep. 24, 2020

(87) PCT Pub. No.: WO2019/189509
PCT Pub. Date: Oct. 3, 2019

(65) Prior Publication Data
US 2021/0086293 A1 Mar. 25, 2021

(30) Foreign Application Priority Data
Mar. 29, 2018 (JP) ................................ 2018-063420

(51) Int. Cl.
*B23K 20/12* (2006.01)
*B23K 101/18* (2006.01)
*B23K 37/04* (2006.01)

(52) U.S. Cl.
CPC ........ *B23K 20/1245* (2013.01); *B23K 20/123* (2013.01); *B23K 20/127* (2013.01); *B23K 37/0408* (2013.01); *B23K 2101/185* (2018.08)

(58) Field of Classification Search
CPC .......................................... B23K 20/122–128
See application file for complete search history.

(56) References Cited

U.S. PATENT DOCUMENTS 5,772,814 A 6/1998 Grewell
6,497,355 B1 * 12/2002 Ding .................... B23K 20/123
228/2.1
(Continued)

FOREIGN PATENT DOCUMENTS

CN 1491770 A 4/2004
CN 106573334 A 4/2017
(Continued)

OTHER PUBLICATIONS

International Search Report (PCT/ISA/210) issued in PCT Application No. PCT/JP2019/013446 dated Jun. 25, 2019 with English translation (three (3) pages).
(Continued)

*Primary Examiner* — Erin B Saad
*Assistant Examiner* — Carlos J Gamino
(74) *Attorney, Agent, or Firm* — Crowell & Moring LLP

(57) ABSTRACT

Provided are a friction stir welding apparatus and a friction stir welding method that achieve highly accurate and highly reliable joining while minimizing an effect of bending of a pressing force receiving portion (carrying table) as a result
(Continued)

of a press by a joining tool unit. The friction stir welding apparatus joins joining target members by friction stir welding. The friction stir welding apparatus is characterized by including: an apparatus main body; a control device that controls an operation of the friction stir welding apparatus; a C-shaped frame connected to the apparatus main body via a first vertical movement drive mechanism unit; a holder unit connected to one end of the C-shaped frame via a second vertical movement drive mechanism unit; and a joining tool held by the holder unit. The C-shaped frame includes a held portion connected to the apparatus main body via the first vertical movement drive mechanism unit, a holder unit holding portion connected to the holder unit via the second vertical movement drive mechanism unit, and a pressing force receiving portion connected to the other end of the C-shaped frame and receiving a pressing force from the joining tool. The control device includes a first joining mode that performs friction stir welding based on a joining command signal that determines a joining condition of the joining tool, and a first holding position determining signal that determines a first holding position of the first vertical movement drive mechanism unit, and a second joining mode that performs friction stir welding based on the joining command signal and a second holding position determining signal obtained by correcting the first holding position determining signal such that a depth or a range of a joined portion becomes constant in accordance with a state of the pressing force receiving portion. The first joining mode and the second joining mode are included in one joining pass from insertion of the joining tool into the joining target members to extraction of the joining target members.

12 Claims, 5 Drawing Sheets

(56) References Cited

U.S. PATENT DOCUMENTS

| | | | | |
|---|---|---|---|---|
| 7,635,075 | B2* | 12/2009 | Hirano | B23K 20/1265 228/2.1 |
| 8,261,959 | B2* | 9/2012 | Cruz | B23K 20/123 228/103 |
| 11,440,132 | B2* | 9/2022 | Ishiguro | B23K 20/123 |
| 2002/0145031 | A1* | 10/2002 | Hirano | B23K 20/123 228/2.1 |
| 2004/0079787 | A1 | 4/2004 | Okamoto et al. | |
| 2004/0112939 | A1* | 6/2004 | Nagao | B23K 20/123 228/102 |
| 2005/0029331 | A1* | 2/2005 | Kano | B23K 20/123 228/112.1 |
| 2014/0183245 | A1 | 7/2014 | Yamaguchi et al. | |
| 2014/0183246 | A1* | 7/2014 | Saitou | B23K 20/1245 228/2.1 |
| 2017/0216960 | A1 | 8/2017 | Sayama et al. | |
| 2020/0016686 | A1* | 1/2020 | Werz | B23K 20/123 |
| 2021/0402503 | A1* | 12/2021 | Zhao | B23K 20/123 |

FOREIGN PATENT DOCUMENTS

| | | | |
|---|---|---|---|
| JP | 9-207219 | A | 8/1997 |
| JP | 2004-136365 | A | 5/2004 |
| JP | 2004-167511 | A | 6/2004 |
| JP | 3859582 | B2 | 12/2006 |
| JP | 2011-200880 | A | 10/2011 |
| JP | 2013-99777 | A | 5/2013 |
| JP | 5426443 | B2 | 2/2014 |
| JP | 5788862 | B2 | 10/2015 |
| JP | 6239172 | B1 | 11/2017 |
| JP | 6408737 | B1 | 10/2018 |
| KR | 10-0660227 | B | 12/2006 |
| WO | WO 2016/024507 | A1 | 2/2016 |

OTHER PUBLICATIONS

Japanese-language Written Opinion (PCT/ISA/237) issued in PCT Application No. PCT/JP2019/013446 dated Jun. 25, 2019 (six (6) pages).

Korean language Office Action issued in Korean Application No. 10-2020-7021383 dated May 26, 2021 with English translation (12 pages).

Chinese-language Office Action issued in Chinese Application No. 201980008871.9 dated May 31, 2021 with English Translation (17 pages).

Korean-language Office Action issued in Korean Application No. 10-2020-7021383 dated Aug. 5, 2021 with English Translation (five (5) pages).

* cited by examiner

FIG. 2

| No. | ELAPSED TIME AFTER FSW JOINING START (s) | CORRECTION AMOUNT OF C-SHAPED FRAME HOLDING POSITION (mm) | NOTE |
|---|---|---|---|
| Start | FSW JOINING START | 0 (REFERENCE VALUE) | FIRST HOLDING POSITION |
| 1 | 0.5 | +0.1 | SECOND HOLDING POSITION |
| 2 | 1.0 | +0.15 | THIRD HOLDING POSITION |
| 3 | 1.5 | +0.2 | FOURTH HOLDING POSITION |
| 4 | 2.0 | +0.2 | FOURTH HOLDING POSITION |
| 5 | 2.5 | +0.2 | FOURTH HOLDING POSITION |
| ⋮ | ⋮ | ⋮ | ⋮ |
| N | 0.5 × N | ±X | YTH HOLDING POSITION |
| End | FSW JOINING END | 0 (REFERENCE VALUE) | FIRST HOLDING POSITION |

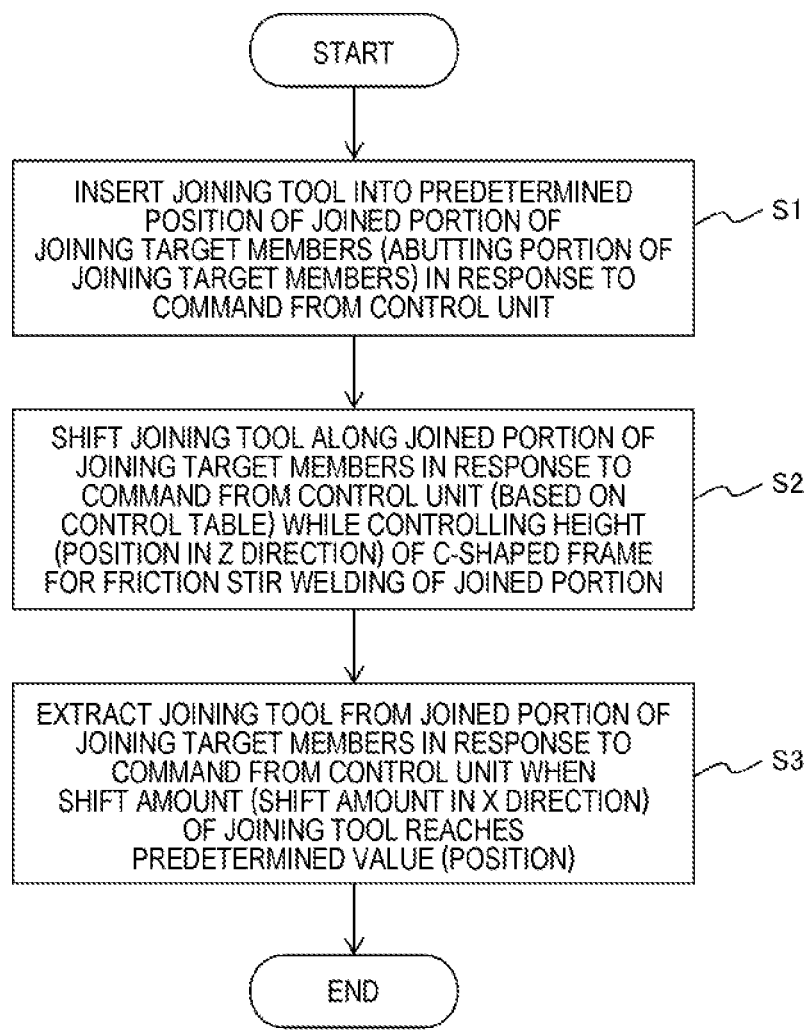

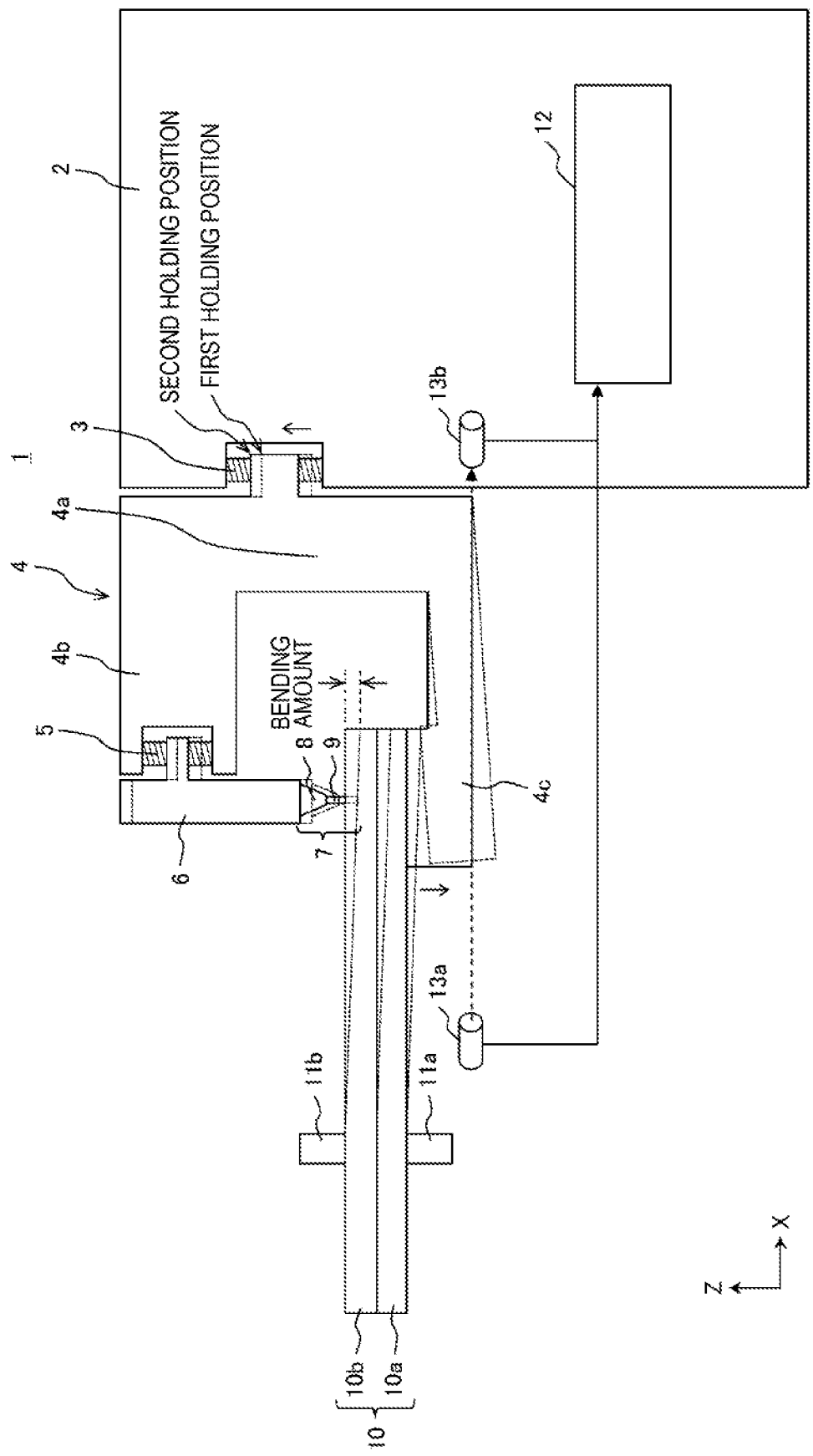

FRICTION STIR WELDING APPARATUS AND FRICTION STIR WELDING METHOD

TECHNICAL FIELD

The present invention relates to a friction stir welding apparatus and a friction stir welding method for joining target members by friction stir welding, and particularly to a technique effectively applied to joining of joining target members having complicated shapes such as automobile bodies.

BACKGROUND ART

Friction stir welding (FSW) joins target materials by softening the target materials with frictional heat generated by rotation of a cylindrical joining tool, and by stirring softened portions, and therefore does not use material other than the joining target materials. Accordingly, FSW which thus exhibits high fatigue strength and no melting of materials achieves joining with less welding deformation (distortion), and therefore is expected to be applied to a wide range of fields such as bodies of aircrafts and automobiles.

For achieving stable joining of joining target members using the FSW device, the joining target members need to be carried (held) in a stable manner. Therefore, a highly rigid carrying table is required. For example, in a case of an FSW device having a C-shaped frame, it is more preferable that the C-shaped frame has a largest possible size and a largest possible thickness.

However, in the automobile industry, there is a tendency of an increasing demand for reduction of the size and the thickness of the C-shaped frame to allow joining of narrower portions having complicated shapes. As a result, rigidity of a pressing force receiving portion of the C-shaped frame decreases, in which condition the pressing force receiving portion may be bent by a press from the joining tool unit during joining.

For example, Patent Literature 1 describes a technique as a background art in the present technical field. PTL 1 discloses "a friction stir welding apparatus which includes a cooling system for cooling a processing target member and a carrying jig carrying the processing target member, and cools a portion which needs cooling while reducing unnecessary thermal expansion of the carrying jig".

In addition, PTL 2 discloses "a friction stir welding method which applies a compensating force having strength equal to strength of a reaction force generated between a workpiece and a rotary tool, which is attached to a tip of an articulated robot arm, and acting in a direction opposite to the direction of the reaction force based on a change in a rotation torque of the rotary tool and a change in a drive shaft torque of the articulated robot to correct positional deviation produced by bending of a joint shaft of the articulated robot.

CITATION LIST

Patent Literature

PTL 1: Japanese Patent No. 5788862
PTL 2: Japanese Patent No. 5426443

SUMMARY OF INVENTION

Technical Problem

As described above, for achieving highly accurate and highly reliable joining of complex and narrow portions using the FSW device, it is necessary to correct bending of the pressing force receiving portion (carrying table) produced as a result of a press by the joining tool unit during joining, that is, positional deviation of the joining target members.

PTL 1 identified above discloses a C-shaped frame typically used for performing friction stir welding. This type of C-shaped frame has a large thickness and high rigidity. Accordingly, PTL 1 does not describe the problem of the bending of the pressing force receiving portion (carrying table) as described above and a technique for correcting the bending.

Moreover, PTL 2 identified above relates to correction of positional deviation produced by bending of the joint shaft of the articulated robot, and therefore is unable to cope with the bending of the pressing force receiving portion (carrying table) of the C-shaped frame as described above.

Accordingly, an object of the present invention is to provide a friction stir welding apparatus and a friction stir welding method capable of performing highly accurate and reliable joining while minimizing an effect of bending of a pressing force receiving portion (carrying table) produced as a result of a press by a joining tool unit during joining of complicated and narrow portions by an FSW device.

Solution to Problem

For solving the above problem, the present invention is directed to a friction stir welding apparatus that joins joining target members by friction stir welding. The friction stir welding apparatus is characterized by including: an apparatus main body; a control device that controls an operation of the friction stir welding apparatus; a C-shaped frame connected to the apparatus main body via a first vertical movement drive mechanism unit; a holder unit connected to one end of the C-shaped frame via a second vertical movement drive mechanism unit; and a joining tool held by the holder unit. The C-shaped frame includes a held portion connected to the apparatus main body via the first vertical movement drive mechanism unit, a holder unit holding portion connected to the holder unit via the second vertical movement drive mechanism unit, and a pressing force receiving portion connected to the other end of the C-shaped frame and receiving a pressing force from the joining tool. The control device includes a first joining mode that performs friction stir welding based on a joining command signal that determines a joining condition of the joining tool, and a first holding position determining signal that determines a first holding position of the first vertical movement drive mechanism unit, and a second joining mode that performs friction stir welding based on the joining command signal and a second holding position determining signal obtained by correcting the first holding position determining signal such that a depth or a range of a joined portion becomes constant in accordance with a state of the pressing force receiving portion. The first joining mode and the second joining mode are included in one joining pass from insertion of the joining tool into the joining target members to extraction of the joining tool.

Moreover, the present invention is directed to a friction stir welding apparatus that joins joining target members by friction stir welding. The friction stir welding apparatus is characterized by including: a control device that controls an operation of the friction stir welding apparatus; a multi-axis robot arm that has multiple joints and is configured to freely move in a three-dimensional space; a C-shaped frame holding unit connected to a tip of the multi-axis robot arm; a C-shaped frame connected to the C-shaped frame holding unit via a first vertical movement drive mechanism unit; a holder unit connected to one end of the C-shaped frame via a second vertical movement drive mechanism unit; and a joining tool held by the holder unit. The C-shaped frame includes a held portion connected to the C-shaped frame holding unit via the first vertical movement drive mechanism unit, a holder unit holding portion connected to the holder unit via the second vertical movement drive mechanism unit, and a pressing force receiving portion connected to the other end of the C-shaped frame and receiving a pressing force from the joining tool. The control device includes a first joining mode that performs friction stir welding based on a joining command signal that determines a joining condition of the joining tool, and a first holding position determining signal that determines a first holding position of the first vertical movement drive mechanism unit, and a second joining mode that performs friction stir welding based on the joining command signal and a second holding position determining signal obtained by correcting the first holding position determining signal such that a depth or a range of a joined portion becomes constant in accordance with a state of the pressing force receiving portion. The first joining mode and the second joining mode are included in one joining pass from insertion of the joining tool into the joining target members to extraction of the joining target members.

Furthermore, the present invention is directed to a friction stir welding method that joins joining target members by friction stir welding. The friction stir welding method is characterized by including: (a) a step for inserting a joining tool into a predetermined position of a joined portion of the joining target members in response to a command from a control unit; (b) a step for performing friction stir welding for the joined portion by shifting the joining tool along the joined portion while controlling a height of the C-shaped frame holding the joining tool such that a depth or a range of the joined portion becomes constant in response to a command from the control unit; and (c) a step for extracting the joining tool from the joined portion when a shift amount of the joining tool reaches a predetermined position in response to a command from the control unit.

Advantageous Effects of Invention

Achievable according to the present invention are a friction stir welding apparatus and a friction stir welding method capable of performing highly accurate and reliable joining while minimizing an effect of bending of a pressing force receiving portion (carrying table) produced as a result of a press by a joining tool unit even in a case of joining of complicated and narrow portions by an FSW device.

Problems, configurations, and effects other than those described above will be apparent from following description of embodiments.

BRIEF DESCRIPTION OF DRAWINGS

FIG. 2 is a diagram showing a control table for performing C-shaped frame holding position correction of the friction stir welding apparatus according to the embodiment of the present invention.

FIG. 3 is a flowchart showing a friction stir welding method according to the embodiment of the present invention.

FIG. 4 is a diagram showing an overall outline of a friction stir welding apparatus according to an embodiment of the present invention.

DESCRIPTION OF EMBODIMENTS

Figure 1:
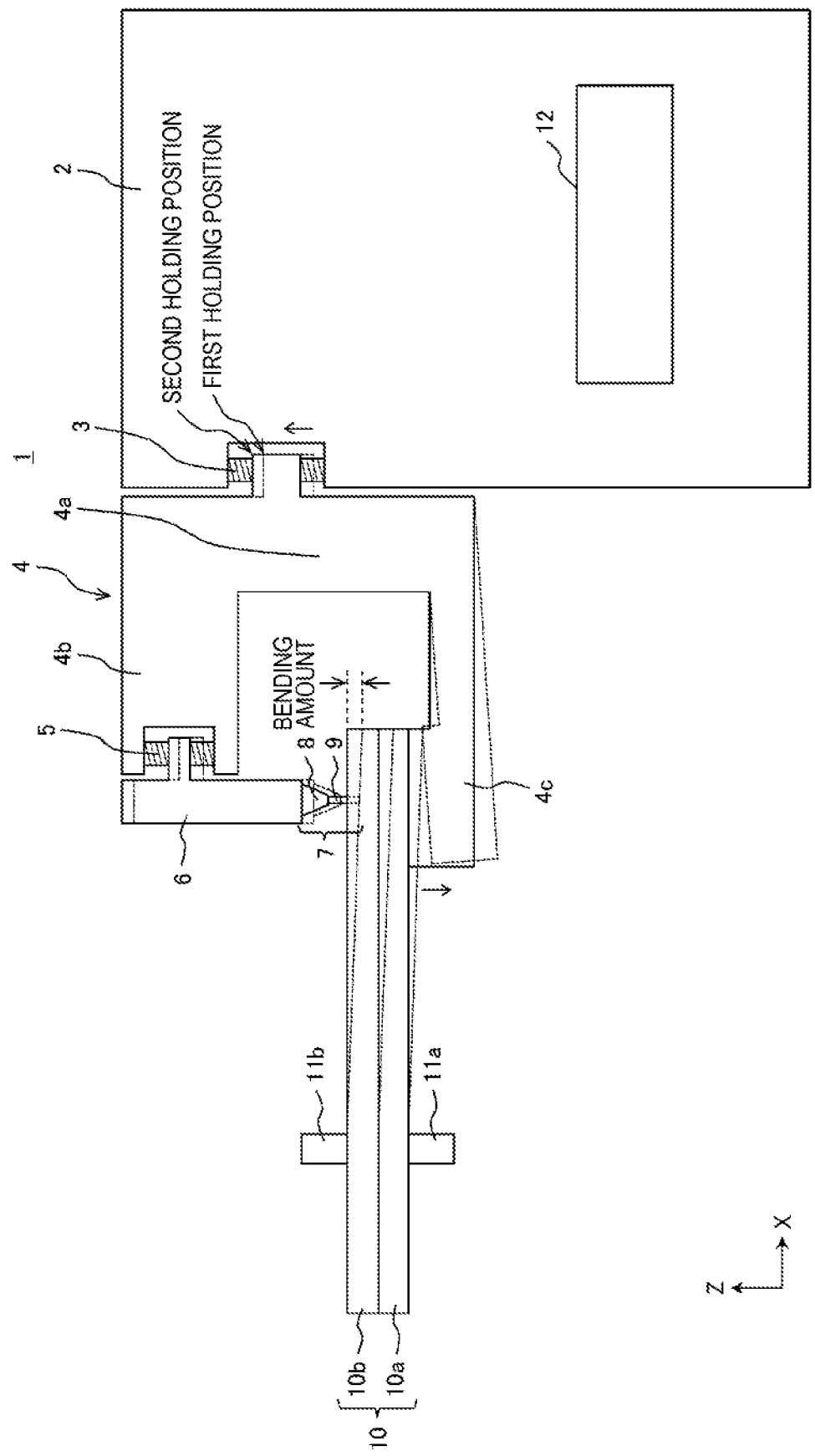
FIG. 1 is a diagram showing an overall outline of a friction stir welding apparatus according to an embodiment of the present invention.

Hereinafter, embodiments of the present invention will be described with reference to the drawings. Note that, in the respective drawings, identical configurations are given identical reference numerals, and that detailed description of the identical parts will not be repeated.

First Embodiment

A friction stir welding apparatus and a friction stir welding method according to a first embodiment will be described with reference to FIGS. 1 to 3. FIG. 1 shows an overall outline of a friction stir welding apparatus 1 of the present embodiment, while FIG. 2 shows an example of a control table for controlling the friction stir welding apparatus 1 (C-shaped frame holding position correction). FIG. 3 is a flowchart showing the friction stir welding method of the present embodiment.

As shown in FIG. 1, the friction stir welding apparatus 1 is chiefly constituted by an apparatus main body 2, a C-shaped frame 4 connected to the apparatus main body 2 via a vertical movement drive mechanism unit (first vertical movement drive mechanism unit) 3, a holder unit (joining head) 6 connected to one end of the C-shaped frame 4 via a vertical movement drive mechanism unit (second vertical movement drive mechanism unit) 5, and a joining tool unit 7 held by the holder unit (joining head) 6. As shown in FIG. 1 by way of example, each of the vertical movement drive mechanism unit (first vertical movement drive mechanism unit) 3 and the vertical movement drive mechanism unit (second vertical movement drive mechanism unit) 5 includes a ball screw or the like, for example. The joining tool unit 7 is constituted by a shoulder 8 and a joining pin 9. The joining pin 9 is held by the holder unit (joining head) 6 via the shoulder 8.

The joining pin 9 is inserted into an abutting portion of joining target members 10, and rotated at a high speed to generate frictional heat between the joining pin 9 and the joining target members 10. A plastic flow is caused in the joining target members 10 by the frictional heat thus generated, and a joined portion is stirred by this flow. With a shift of the joining pin 9, the stirred portion (joined portion) is cooled, whereby the joining target members are joined to each other.

Note that described herein as the joining target members 10 by way of example are composite materials constituted by a steel frame material (10a) and a thin aluminum material (10b), such as an automobile body.

The C-shaped frame 4, which is substantially C-shaped (substantially U-shaped), includes a held portion (upright portion) 4a connected to the apparatus main body 2 via the vertical movement drive mechanism unit (first vertical movement drive mechanism unit) 3, a holder unit holding portion 4b connected to the holder unit (joining head) 6 via the vertical movement drive mechanism unit (second vertical movement drive mechanism) 5, and a pressing force receiving portion 4c connected to the other end of the C-shaped frame 4 and receiving a pressing force from the joining tool unit 7 during friction stir welding.

A control unit (control device) 12 which controls an operation of the friction stir welding apparatus 1 is included in the apparatus main body 2. The control unit (control device) 12 includes a storage unit (not shown) which stores joining parameters (FSW joining conditions), such as a joining condition signal (joining command signal) for determining joining conditions for joining by the joining tool unit 7, a holding position determining signal for determining a holding position of the C-shaped frame 4 with respect to the apparatus main body 2 in a height direction (Z direction) by using the vertical movement drive mechanism unit (first vertical movement drive mechanism unit) 3, a holding position determining signal for determining a holding position of the holder unit (joining head) 6 with respect to the C-shaped frame 4 (holder unit holding portion 4b) in the height direction (Z direction) by using the vertical movement drive mechanism unit (second vertical movement drive mechanism unit) 5.

Next, control of the friction stir welding apparatus 1 (C-shaped frame holding position correction) will be described. In FIG. 1, the joining target members 10 are held (supported) in the vertical direction by joining target member holding portions 11a and 11b, and are also held (supported) by the pressing force receiving portion 4c during friction stir welding. As described above, a C-shaped frame having reduced size and thickness is used at the time of joining of narrower portions having complicated shapes. Accordingly, rigidity of the C-shaped frame decreases, and the pressing force receiving portion 4c which receives a pressing force from the joining tool unit 7 may bend downward as indicated by dotted lines in FIG. 1. In this case, the joining target members 10 (10a, 10b) supported by the pressing force receiving portion 4c also bend downward.

When friction stir welding using the joining tool unit 7 is continued in a state where the pressing force receiving portion 4c and the joining target members 10 (10a, 10b) are bent, a depth or a range of the joined portion (joined surface) changes. In this case, quality of the joined portion (joining reliability) may deteriorate.

Accordingly, the friction stir welding apparatus 1 of the present embodiment corrects the holding position of the C-shaped frame 4 with respect to the apparatus main body 2 in the height direction (Z direction) (raises from a first holding position to a second holding position herein as shown in FIG. 1) by using the vertical movement drive mechanism unit (first vertical movement drive mechanism unit) 3 to maintain a constant depth or range of the joined portion (joined surface). More specifically, correction is made in the opposite direction (upward direction) by an amount (distance) equivalent to the bending amount of the pressing force receiving portion 4c of the C-shaped frame 4. The respective states of the pressing force receiving portion 4c and the joining target members 10 (10a, 10b) thus corrected are indicated by solid lines in FIG. 1. For securing quality of the joined portion (joining reliability), it is preferable that the pressing force receiving portion 4c and the joining target members 10 (10a, 10b) after the position correction are brought into substantially the same states (positions) as the states before the pressing force is applied from the joining tool unit 7.

The holding position correction of the C-shaped frame 4 with respect to the apparatus main body 2 in the height direction (Z direction) by using the vertical movement drive mechanism unit (first vertical movement drive mechanism unit) 3 is performed based on a database or a control table stored (registered) beforehand in a storage unit of the control unit (control device) 12. FIG. 2 shows an example of a control table for correcting the holding position of the C-shaped frame 4.

A holding position correction amount of the C-shaped frame 4 at a start of friction stir welding (at Start) is 0 (reference value). The holding position at this time is referred to as the first holding position. (A state where friction stir welding is performed by controlling operations of the joining tool unit 7 and the vertical movement drive mechanism unit (first vertical movement drive mechanism unit) 3 in accordance with a joining condition signal (joining command signal) for determining a joining condition of the joining tool unit 7, and a first holding position determining signal for determining the first holding position of the vertical movement drive mechanism unit (first vertical movement drive mechanism unit) 3 both output from the storage unit of the control unit (control device) 12 is herein referred to as a "first joining mode", for example.)

After an elapse of 0.5 seconds from the start of friction stir welding (No. 1 in FIG. 2), each bending amount of the pressing force receiving portion 4c and the joining target members 10 becomes 0.1 mm (−0.1 mm) downward. Accordingly, the holding position correction amount of the C-shaped frame 4 is set to 0.1 mm (+0.1 mm) upward. The holding position at this time is referred to as the second holding position. (A state where friction stir welding is performed by controlling operations of the joining tool unit 7 and the vertical movement drive mechanism unit (first vertical movement drive mechanism unit) 3 in accordance with the joining condition signal (joining command signal) for determining the joining condition of the joining tool unit 7, and a second holding position determining signal for determining the second holding position of the vertical movement drive mechanism unit (first vertical movement drive mechanism unit) 3 both output from the storage unit of the control unit (control device) 12 is referred to as a "second joining mode", for example.)

Thereafter, the holding position of the C-shaped frame 4 is corrected by similar control (correction) in accordance with the elapsed time after the start of friction stir welding. According to the example of FIG. 2, after an elapse of 1.0 second from the start of friction stir welding (No. 2 in FIG. 2), each bending amount of the pressing force receiving portion 4c and the joining target members 10 becomes 0.15 mm (−0.15 mm) downward. Accordingly, the holding position correction amount of the C-shaped frame 4 is set to 0.15 mm (+0.15 mm) upward. The holding position at this time is a third holding position. In addition, after an elapse of 1.5 seconds from the start of friction stir welding (No. 3 in FIG. 2), each bending amount of the pressing force receiving portion 4c and the joining target members 10 becomes 0.2 mm (−0.2 mm) downward. Accordingly, the holding position correction amount of the C-shaped frame 4 is set to 0.2 mm (+0.2 mm) upward. The holding position at this time is a fourth holding position.

Note that FIG. 2 shows an example where progress of each bending of the pressing force receiving portion 4c and the joining target members 10 stops (comes to an equilibrium state) after the elapse of 1.5 seconds from the start of friction stir welding. In this case, the bending amount is maintained at 0.2 mm (−0.2 mm) downward, while the holding position correction amount of the C-shaped frame 4 is maintained at 0.2 mm (+0.2 mm) upward. Therefore, the holding position is maintained at the fourth holding position.

At an end of friction stir welding (at End), the pressing force from the joining tool unit 7 stops. In this case, the holding position correction amount of the C-shaped frame 4 returns to 0 (reference value). Therefore, the holding position of the C-shaped frame 4 also returns to the first holding position.

As described above, according to the holding position correction of the C-shaped frame 4 based on the control table as shown in FIG. 2, the operations of the joining tool unit 7 and the vertical movement drive mechanism unit (the first vertical movement drive mechanism unit) 3 are controlled such that a plurality of joining modes (for example, the first joining mode and the second joining mode described above) are contained in one joining operation (one joining pass) from the friction stir welding start (Start in FIG. 2) to the friction stir welding end (End in FIG. 2). In this manner of control, the depth and the range of the joined point (joined surface) of the joining target members are kept constant in the period from the joining start to the joining end even when the pressing force receiving portion 4c of the C-shaped frame 4 is bent by the pressing force from the joining tool unit 7.

Note that the control table shown in FIG. 2 is presented only by way of example to explain the operation of the present embodiment in an easy-to-understand manner. Accordingly, the relationship between the elapsed time from the friction stir welding start, the bending amount of each of the pressing force receiving portion 4c and the joining target members 10, and the holding position correction amount of the C-shaped frame 4 is not limited to this control table.

A typical friction stir welding method using the friction stir welding apparatus of the present embodiment described above will be described with reference to FIG. 3.

Initially, in response to a command from the control unit (control device) 12, the joining tool unit 7 is inserted into a predetermined position of a joined portion of the joining target members 10 (abutting portion of the joining target members). (Step S1)

Next, in response to a command from the control unit (control device) 12 (for example, based on the control table shown in FIG. 2), the joining tool unit 7 is shifted along the joined portion of the joining target members 10 while controlling the height of the C-shaped frame 4 (position in the Z direction) for friction stir welding of the joined portion. (Step S2)

Subsequently, in response to a command from the control unit (control device) 12, the joining tool unit 7 is extracted from the joined portion of the joining target members 10 when the shift amount of the joining tool unit 7 (shift amount in the X direction) reaches a predetermined value (position). Thereafter, the friction stir welding process ends. (Step S3)

As described above, the friction stir welding apparatus and the friction stir welding method of the present embodiment store the correction amount corresponding to the bending amount of the pressing force receiving portion of the C-shaped frame in accordance with the elapsed time from the start of friction stir welding, and corrects the bending of the pressing force receiving portion based on the correction amount. In this manner, bending as a result of a press by the joining tool can be corrected even when the size and the thickness of the C-shaped frame are reduced. Accordingly, highly accurate and reliable joining is achievable while minimizing an effect of bending of a pressing force receiving portion (carrying table) as a result of a press by the joining tool unit even when complicated and narrow portions such as an automobile body are joined by using an FSW device.

While the example of the control using the control table has been described above as the method for correcting the holding position of the C-shaped frame 4, the holding position of the C-shaped frame 4 may be corrected based on a database stored (registered) in the storage unit of the control unit (control device) 12 beforehand, as a database indicating a material of the joining target members 10, a current value supplied to the joining tool unit 7, and a bending correction amount corresponding to these.

Moreover, in addition to the correction of the holding position of the C-shaped frame 4 with respect to the apparatus main body 2 in the height direction (Z direction) by using the vertical movement drive mechanism unit (first vertical movement drive mechanism unit) 3, the holding position of the holder unit (joining head) 6 with respect to the C-shaped frame 4 (holder unit holding portion 4b) in the height direction (Z direction) may be further corrected by using the vertical movement drive mechanism unit (second vertical movement drive mechanism unit) 5. In this case, the joining tool unit 7 can be further driven (finely adjusted) to the holding position by using the vertical movement drive mechanism unit (second vertical movement drive mechanism unit) 5 to prevent a shift of the holding position of the joining tool unit 7 even after correction of the position of the pressing force receiving portion 4c of the C-shaped frame 4.

Furthermore, while the fixed installation type FSW device shown in FIG. 1 has been employed in the present embodiment, similar advantageous effects can be offered by application to a robot FSW device where the C-shaped frame is connected to a multi-axis robot. (This application will be described below in a third embodiment.)

Second Embodiment

A friction stir welding apparatus and a friction stir welding method according to a second embodiment will be described with reference to FIG. 4. FIG. 4 shows an overall outline of the friction stir welding apparatus 1 of the present embodiment, as a diagram corresponding to FIG. 1 of the first embodiment.

The friction stir welding apparatus 1 of the present embodiment is different from the friction stir welding apparatus of the first embodiment in that sensors 13a and 13b each detecting a state (bending amount) of the pressing force receiving portion 4c of the C-shaped frame 4 are provided. Other configurations are similar to those of the first embodiment (FIG. 1).

While the first embodiment corrects the bending amount of the pressing force receiving portion 4c based on the control table or the database stored (registered) beforehand in the storage unit of the control unit (control device) 12, the present embodiment corrects the holding position of the C-shaped frame 4 with respect to the apparatus main body 2 in the height direction (Z direction) by using the vertical movement drive mechanism unit (first vertical movement drive mechanism unit) 3 in accordance with the state (bending amount) of the pressing force receiving portion 4c detected by the sensors 13a and 13b. That is, the second holding position determining signal is calculated by correcting the first holding position determining signal based on the detection values of the sensors 13a and 13b. The holding position of the C-shaped frame 4 is controlled in accordance with the second holding position determining signal.

For detecting the state (bending amount) of the pressing force receiving portion 4c using the sensors 13a and 13b, the bending amount is acquired at predetermined time intervals, for example. The bending correction amount is determined and corrected based on data (bending amount) thus acquired.

Note that examples of the sensors 13a and 13b include transmission type laser sensors including light emitting and receiving elements 13a and 13b as shown in FIG. 4, bending sensors or semiconductor distortion sensors which directly detect displacement of the pressing force receiving portion 4c, and capacitance type proximity sensors or displacement sensors which directly detect displacement of the pressing force receiving portion 4c.

According to the present embodiment, highly accurate and highly reliable joining is achievable while minimizing an effect of bending of the pressing force receiving portion (carrying table) as a result of a press by the joining tool unit similarly to the first embodiment.

Third Embodiment

Figure 5:
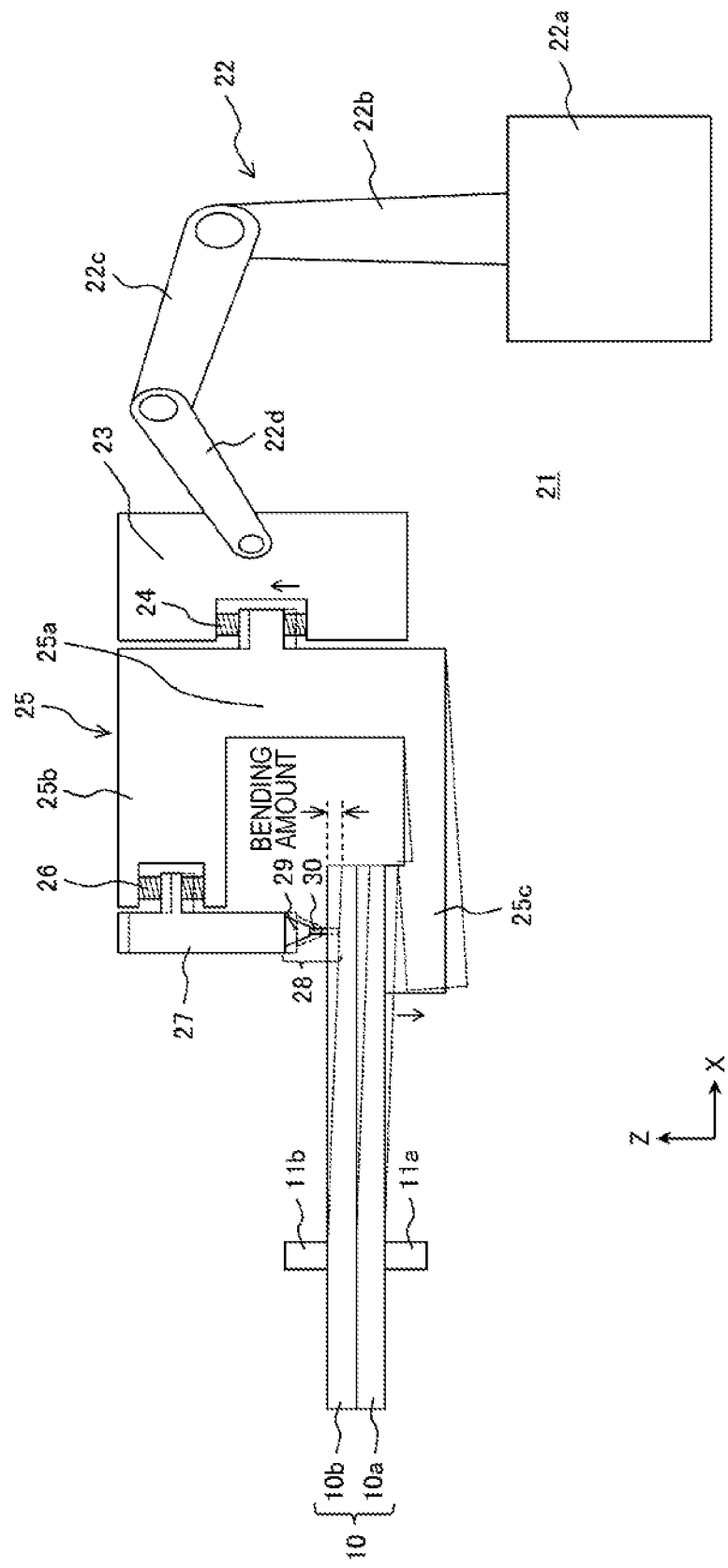
FIG. 5 is a diagram showing an overall outline of a friction stir welding apparatus according to an embodiment of the present invention.

A friction stir welding apparatus and a friction stir welding method according to a third embodiment will be described with reference to FIG. 5. FIG. 5 shows an overall outline of a friction stir welding apparatus 21 of the present embodiment.

As shown in FIG. 5, the friction stir welding apparatus 21 is chiefly constituted by a multi-axis robot 22, a C-shaped frame 25 connected to the multi-axis robot 22 via a C-shaped frame holding unit 23 and a vertical movement drive mechanism unit (first vertical movement drive mechanism unit) 24, a holder unit (joining head) 27 connected to the C-shaped frame 25 via a vertical movement drive mechanism unit (second vertical movement drive mechanism unit) 26, and a joining tool unit 28 held by the holder unit (joining head) 27. The joining tool unit 28 is constituted by a shoulder 29 and a joining pin 30. The joining pin 30 is held by the holder unit (joining head) 27 via the shoulder 29.

The multi-axis robot 22 is a vertical articulated robot generally called a robot arm, and can be freely operated (shifted) in a three-dimensional space by an articulated structure and a servomotor. A movable range changes depending on the number of joints (number of axes). Presented herein is an example of a triaxial type robot arm which includes a lower arm portion 22b, an upper arm portion 22c, and a wrist portion 22d disposed on a pedestal portion 22a. White circles of the multi-axis robot 22 indicate joints.

Note that the friction stir welding apparatus 21 includes a control device (not shown) which houses a servo amplifier, a substrate, and the like, and comprehensively controls movement of the multi-axis robot 22 and a joining condition of the joining tool unit 28 in accordance with a command (program signal) from this control device.

The C-shaped frame holding unit 23 is rotatably connected to a tip of the wrist portion 22d of the multi-axis robot 22. The C-shaped frame 25 having a substantially C-shape (substantially U-shape) is connected to the C-shaped frame holding unit 23 via the vertical movement drive mechanism unit (first vertical movement drive mechanism unit) 24.

The C-shaped frame 25 includes a held portion (upright portion) 25a connected to the C-shaped frame holding unit 23 via the vertical movement drive mechanism unit (first vertical movement drive mechanism unit) 24, a holder unit holding portion 25b connected to one end of the held portion 25a and holding the holder unit (joining head) 27 via the vertical movement drive mechanism unit (second vertical movement drive mechanism unit) 26, and a pressing force receiving portion 25c connected to the other end of the held portion (upright portion) 25a and receiving a pressing force from the joining tool unit 28.

While FIG. 5 shows the example where the held portion (upright portion) 25a, the holder unit holding portion 25b, and the pressing force receiving portion 25c constitute the C-shaped frame 25 as an integral body, also adoptable is such an example where the respective portions are constituted by separate bodies and combined to form the C-shaped frame 25.

The C-shaped frame 25 is connected to the C-shaped frame holding unit 23 via the vertical movement drive mechanism unit (first vertical movement drive mechanism unit) 24, and operates in the vertical direction (Z direction in FIG. 5) with respect to the C-shaped frame holding unit 23.

The holder unit (joining head) 27 is connected to the C-shaped frame 25 (holder unit holding portion 25b) via the vertical movement drive mechanism unit (second vertical movement drive mechanism unit) 26, and operates in the vertical direction (Z direction in FIG. 5) with respect to the C-shaped frame 25.

The joining tool unit 28 is constituted by the shoulder 29 and the joining pin 30. Friction stir welding is achieved by inserting the joining pin 30 into the joining target members 10 by a predetermined depth while rotating the joining pin 30 at a high speed, and shifting the joining pin 30 along the joined portion (joining line).

The friction stir welding apparatus 21 of the present embodiment is configured as described above, and the holding position of the C-shaped frame 25 with respect to the C-shaped frame holding unit 23 (multi-axis robot 22) in the height direction (Z direction) can be corrected by using the vertical movement drive mechanism unit (first vertical movement drive mechanism unit) 24 similarly to the first embodiment. Accordingly, even the pressing force receiving portion 25c of the C-shaped frame 25 is bent by the pressing force from the joining tool unit 28, correction can be made in the opposite direction (upward) by the same amount (distance) as the bending amount.

Other configurations and operations (actions) of the method for correcting the holding position of the C-shaped frame 25 of present embodiment are basically similar to those of the first and second embodiments in such points that: correction (control) is performed based on the control table or the database; correction is also allowed to be performed in accordance with the state (bending amount) of the pressing force receiving portion 25c detected by the sensor; and the holding position of the holder unit (joining head) 27 in the height direction (Z direction) is correctable using the vertical movement drive mechanism unit (second vertical movement drive mechanism unit) 26 as well as correction of the holding position of the C-shaped frame 25 in the height direction (Z direction) using the vertical movement drive mechanism unit (first vertical movement drive mechanism unit) 24. Accordingly, detailed description of these points is not repeated.

According to the present embodiment, highly accurate and highly reliable joining is achievable while minimizing an effect of the bending of the pressing force receiving portion (carrying table) as a result of a press from the joining tool unit similarly to the other embodiments.

In addition, in the present embodiment, the C-shaped frame 25 is held by the multi-axis robot arm 22 via the C-shaped frame holding unit 23 and the vertical movement drive mechanism unit (first vertical movement drive mechanism unit) 24. In this case, the joined point (joined surface) can be freely shifted in a three-dimensional space. Accordingly, friction stir welding of joining target members, which are three-dimensionally arranged and have complicated shapes including curved surfaces, such as automobile bodies, is accurately achievable.

Note that the present invention is not limited to the embodiments described above, but includes various modifications.

For example, the embodiments have been described in detail to help easy understanding of the present invention, and therefore are not necessarily required to include all the configurations described above. A part of a configuration of one embodiment may be replaced with a configuration of a different embodiment, and a configuration of a different embodiment may be added to a configuration of one embodiment. A part of a configuration of the respective embodiments may be deleted or replaced with a different configuration, or a different configuration may be added to a part of a configuration of the respective embodiments.

The present invention also has following characteristics.
[Addition 1]
A friction stir welding method that uses a friction stir welding apparatus including: an apparatus main body that includes a vertical movement drive mechanism unit; a C-shaped frame constituted by a held portion held by the vertical movement drive mechanism unit, a holder unit holding portion that holds a holder unit at one end of the held portion, and a pressing force receiving portion that receives a pressing force from a joining tool unit held at the other end of the held portion; and the joining tool unit held by the holder unit. The friction stir welding method is characterized by including: a step for storing, in the apparatus main body, a first holding position determining value for determining a first holding position of the vertical movement drive mechanism unit, a plurality of second holding positions for determination in accordance with an elapsed time after a joining start, and a joining condition for the joining tool unit; a step for determining a holding position of the vertical movement drive mechanism unit at a start of friction stir welding based on the first holding position determining value, and starting friction stir welding based on the joining condition; and a step for repeating friction stir welding based on the joining condition while changing the holding position of the vertical movement drive mechanism unit based on the second holding position determining value corresponding to a predetermined elapsed time after the start of friction stir welding.
[Addition 2]
A friction stir welding method that uses a friction stir welding apparatus including: an apparatus main body that includes a vertical movement drive mechanism unit; a C-shaped frame constituted by a held portion held by the vertical movement drive mechanism unit, a holder unit holding portion that holds a holder unit at one end of the held portion, and a pressing force receiving portion that receives a pressing force from a joining tool unit held at the other end of the held portion; and the joining tool unit held by the holder unit. The friction stir welding method is characterized by including: a step for storing, in the apparatus main body, a first holding position determining value for determining a first holding position of the vertical movement drive mechanism unit, and a joining condition for the joining tool unit; a step for determining a holding position of the vertical movement drive mechanism unit at a start of friction stir welding based on the first holding position determining value, and starting friction stir welding based on the joining condition; and a step for determining a second holding position determining value based on a bending amount of the pressing force receiving portion acquired from a position sensor disposed on the pressing force receiving portion after an elapse of a predetermined time from the start of friction stir welding, and repeating friction stir welding based on the joining condition while changing the holding position of the vertical movement drive mechanism unit based on the second holding position determining value.
[Addition 3]
The friction stir welding method according to addition 1 or addition 2, characterized in that the holder unit holding portion is further driven (finely adjusted) in accordance with a change amount of a change of the holding position of the vertical movement drive mechanism unit in accordance with the second holding position determining value determined based on the elapsed time after friction stir welding.

REFERENCE SIGNS LIST 1 friction stir welding apparatus
2 apparatus main body
3, 5 vertical movement drive mechanism unit (ball screw)
4 C-shaped frame
4a held portion (upright portion)
4b holder unit holding portion
4c pressing force receiving portion
6 holder unit (joining head)
7 joining tool unit
8 shoulder
9 joining pin
10, 10a, 10b joining target member
11, 11a, 11b joining target member holding portion
12 control unit (control device)
13, 13a, 13b sensor
21 friction stir welding apparatus
22 multi-axis robot
22a pedestal portion
22b lower arm portion
22c upper arm portion
22d wrist portion
23 C-shaped frame holding unit
24, 26 vertical movement drive mechanism unit (ball screw)
25 C-shaped frame
25a held portion (upright portion)
25b holder unit holding portion
25c pressing force receiving portion
27 holder unit (joining head)
28 joining tool unit
29 shoulder
30 joining pin

The invention claimed is:

1. A friction stir welding apparatus that joins joining target members by friction stir welding, the friction stir welding apparatus comprising:
an apparatus main body;
a control device that controls an operation of the friction stir welding apparatus;
a C-shaped frame connected to the apparatus main body via a first vertical movement drive mechanism unit;
a holder unit connected to one end of the C-shaped frame via a second vertical movement drive mechanism unit; and
a joining tool held by the holder unit,
wherein the C-shaped frame includes
a held portion connected to the apparatus main body via the first vertical movement drive mechanism unit,
a holder unit holding portion connected to the holder unit via the second vertical movement drive mechanism unit, and
a pressing force receiving portion connected to the other end of the C-shaped frame and receiving a pressing force from the joining tool,
the control device includes a first joining mode that performs friction stir welding based on a joining command signal that determines a joining condition of the joining tool, and a first holding position determining signal that determines a first holding position of the first vertical movement drive mechanism unit, and a second joining mode that performs friction stir welding based on the joining command signal and a second holding position determining signal obtained by correcting the first holding position determining signal such that a depth or a range of a joined portion becomes constant in accordance with a state of the pressing force receiving portion, and the first joining mode and the second joining mode are included in one joining pass from insertion of the joining tool into the joining target members to extraction of the joining tool.

2. The friction stir welding apparatus according to claim 1, wherein the control device determines the joining condition of the joining tool, and the holding position of the C-shaped frame by the first vertical movement drive mechanism unit in either the first joining mode and the second joining mode.

3. The friction stir welding apparatus according to claim 2, wherein the control device starts friction stir welding for the joining target members in the first joining mode, and switches to the second joining mode after an elapse of a predetermined time.

4. The friction stir welding apparatus according to claim 1, wherein the control device includes a storage unit that stores the joining command signal, the first holding position determining signal, and the second holding position determining signal.

5. The friction stir welding apparatus according to claim 4, wherein the control device causes the storage unit to store beforehand the holding position of the C-shaped frame determined in accordance with an elapsed time after a start of friction stir welding, and determines the second holding position determining signal based on the stored holding position.

6. The friction stir welding apparatus according to claim 5, wherein the control device determines the second holding position determining signal based on a plurality of holding position determining signals stored beforehand in accordance with the elapsed time after the start of friction stir welding.

7. The friction stir welding apparatus according to claim 1, wherein
the friction stir welding apparatus includes a sensor that detects a state of the pressing force receiving portion, and
the control device corrects the first holding position determining signal in accordance with the state of the pressing force receiving portion detected by the sensor to determine the second holding position determining signal.

8. The friction stir welding apparatus according to claim 1, wherein the control device corrects the holding position of the holder unit by the second vertical movement drive mechanism unit in accordance with the determined second holding position determining signal when the second holding position determining signal is determined by correcting the first holding position determining signal in accordance with a state of the pressing force receiving portion.

9. A friction stir welding apparatus that joins joining target members by friction stir welding, the friction stir welding apparatus comprising:
a control device that controls an operation of the friction stir welding apparatus;
a multi-axis robot arm that has multiple joints and is configured to freely move in a three-dimensional space;
a C-shaped frame holding unit connected to a tip of the multi-axis robot arm;
a C-shaped frame connected to the C-shaped frame holding unit via a first vertical movement drive mechanism unit;
a holder unit connected to one end of the C-shaped frame via a second vertical movement drive mechanism unit; and
a joining tool held by the holder unit,
wherein the C-shaped frame includes
a held portion connected to the C-shaped frame holding unit via the first vertical movement drive mechanism unit,
a holder unit holding portion connected to the holder unit via the second vertical movement drive mechanism unit, and
a pressing force receiving portion connected to the other end of the C-shaped frame and receiving a pressing force from the joining tool,
the control device includes
a first joining mode that performs friction stir welding based on a joining command signal that determines a joining condition of the joining tool, and a first holding position determining signal that determines a first holding position of the first vertical movement drive mechanism unit, and
a second joining mode that performs friction stir welding based on the joining command signal and a second holding position determining signal obtained by correcting the first holding position determining signal such that a depth or a range of a joined portion becomes constant in accordance with a state of the pressing force receiving portion, and
the first joining mode and the second joining mode are included in one joining pass from insertion of the joining tool into the joining target members to extraction of the joining target members.

10. The friction stir welding apparatus according to claim 9, wherein the control device determines the joining condition of the joining tool, and the holding position of the C-shaped frame by the first vertical movement drive mechanism unit in either the first joining mode and the second joining mode.

11. The friction stir welding apparatus according to claim 10, wherein the control device starts friction stir welding for the joining target members in the first joining mode, and switches to the second joining mode after an elapse of a predetermined time.

12. The friction stir welding apparatus according to claim 9, wherein
the friction stir welding apparatus includes a sensor that detects a state of the pressing force receiving portion, and
the control device corrects the first holding position determining signal in accordance with the state of the pressing force receiving portion detected by the sensor to determine the second holding position determining signal.

* * * * *